Patented Feb. 11, 1936

2,030,518

UNITED STATES PATENT OFFICE 2,030,518

CONCRETE CONSTRUCTION

Francis Walter Guibert, Beverly Hills, Calif.

No Drawing. Application November 27, 1933,
Serial No. 699,975

4 Claims. (Cl. 106—24)

This invention relates to the use of hydraulic cement in concrete construction and more particularly it relates to a method or series of steps for processing a concrete mixture for road building and other structures.

Substantially it comprises first, ascertaining the water content of the sand, gravel and aggregate being used and computing the correct quantity of water to be added according to the water-cement ratio law; second, the addition to this of a calcium chloride-oil composition or emulsion; and third, the addition to the cement being used of the correct quantity of water as determined above and thoroughly mixing with the cement. In the meantime the sand, gravel, aggregate and oil-calcium chloride solution is being thoroughly mixed. After both these batches have been given their correct cycle of mixing they are then added together and given an additional thorough mixing. The fourth step, after the concrete has been poured or placed, is a thorough vibration of the mass.

By this method of progressive steps a far superior concrete will be produced. The present method of making concrete is too haphazard to produce the best results, inasmuch as the disposition of the contractor is to make the mixture as wet or soupy as possible so that it may be easily poured or chuted into place with a minimum cost of tamping, etc., and this non-observance of the water-cement ratio law, which calls for a minimum amount of water but sufficient to properly hydrate the cement, produces an inferior concrete. Therefore, an accurate control of the water-cement ratio is absolutely necessary and with my method the strengths can readily be charted in advance by an engineer familiar with the ingredients making up the concrete and the correct use of the water-cement ratio law. Inasmuch as the aggregate, sand, gravel, cement, and admixtures vary greatly in different localities, it is necessary that the engineer predetermine the proper combination to give the best results which he can do by the many well-known methods, and this mixture I will refer to hereafter as "plain concrete".

The moisture content of the sand, gravel and aggregate being used may be predetermined by appropriate and well understood hydrometer tests, but I prefer to use a specific saline solution, passing same through a measured quantity of sand, gravel, aggregate, etc., and the resultant specific gravity of the solution noted and the difference in the two values of the specific gravity is then used as a basis for the water computation or moisture content. With this knowledge the requisite amount of water to be added can then accurately be gauged for each batch according to the quantity of cement to be added. This amount of water, therefore, must be delivered accurately to the batch and to accomplish this I prefer to use an automatic liquid measuring system which will deliver this same accurate quantity and thus give uniformity in strength and consistency and uniform workability as well as uniform curing and shrinkage during the curing period. All this is most important, inasmuch as without this accurate water control a variable of up to 50% in strengths have been the result, whereas where a true water-cement ratio has been accurately maintained, this variable has been consistently reduced to less than 7%.

While the water and cement are being mixed, I add to the sand-gravel-aggregate combination an oil and calcium chloride solution or emulsion in proportion to the quantity of cement to be used. I prefer using a calcium chloride solution of specific gravity 1.6. This oil-calcium chloride mixture is obtained by heating the calcium chloride solution to about 350° F., and then adding a fairly viscous hydrocarbon oil of approximately one part oil to one and one-half parts heated calcium chloride of specific gravity of about 1.6. I add approximately 2% by weight of this mixture to the cement. Or alternatively, to 13 pounds calcium chloride there is added a gallon of refined petroleum oils, and approximately 2% of this per sack of 94 pounds of cement added to the batch in the mixer.

While my improved method contemplates mixing the cement and water together thoroughly prior to pouring into the batch of aggregate, sand, gravel, oil, calcium chloride combination which has also been thoroughly mixed separately, this step may be eliminated where the construction of the batching device will not permit of the separate mixtures, but the entire mass can be dumped into the mixer and mixed together.

The addition of the oil-calcium chloride solution gives a high degree of workability to the concrete inasmuch as the oil covers the particles and the mass flows down the chute in a fat, uniform condition and without segregation and each particle slides into place more readily than plain concrete, thus giving a greater density and at the same time preventing to a great measure laitance and efflorescence during and after the placing of the concrete. The acceleration to the cement caused by the oil-calcium chloride mixture gives high early strengths in addition to waterproofness and permits of early stripping of forms. This high strength is carried through the life of the concrete and permits of a leaner cement mixture, if so desired. In addition, the oil-calcium chloride gives a hard, tough surface highly resistant to abrasion and tends to retard the escape or evaporation of water from the freshly placed concrete, thus rendering it less susceptible to the harmful effects of premature drying out. Another object of its use is to make it possible to construct concrete roads and structures in weather that is below freezing and yet obtain a high quality structure that will withstand temperature changes and exhibit high strength. Owing to the waterproofing characteristic given the concrete, very little moisture such as rain or snow is absorbed after the concrete is properly set and in winter time such moisture in plain concrete freezes and causes cracks due to the expansion of the freezing water. Furthermore, a lower water content may be used in as much as oil has a tendency to float the sand and by using the leaner cement mixtures there will be obtained the advantage of reduced shrinkage, crazing, hair-cracking and dusting.

After the batch has been sufficiently mixed and placed in forms the mass should be vigorously vibrated, as light tamping or shaking does not prove as efficient as a vigorous, heavy vibration, particularly on roads. For the latter I prefer passing a short, compact track-laying crawler or tractor over the concrete, the tractor having on one of its rotating parts a heavy unbalanced flywheel. The tractor should lay a flat, smooth track. This vigorous vibration renders a closely knit, homogeneous structure because the oil reduces the friction between the particles making up the concrete. This heavy vibration insures the whole depth to be agitated instead of merely the top portion, and forces any excess moisture to the top where it can be drained off or otherwise removed. If desired, water may be sprinkled over the road for a few days after the initial set, and this is recommended in hot, dry climates where the evaporation is excessive.

I claim:

1. The process which comprises mixing in separate batches, a mixture of hydraulic cement and water, and a mixture of the remaining constituents of concrete, adding an oily material to the said remaining constituents, and mixing the two batches.

2. The process which comprises mixing in separate batches, a mixture of hydraulic cement and water, and a mixture of the remaining constituents of concrete, adding an oily hydration accelerator to the said remaining constituents, and mixing the two batches.

3. The process of preparing a hydraulic cement mixture, which comprises heating an accelerator to about 350° F., mixing with said accelerator in about equal amounts, a refined heavy hydrocarbon oil; and adding the resultant emulsion to a hydraulic cement mixture.

4. The process of preparing a hydraulic cement mixture, which comprises adding oil to a solution of calcium chloride heated to a temperature neighboring 350° Fahrenheit; thoroughly mixing the oil and the solution; and adding the resultant emulsion to a thoroughly mixed hydraulic cement mixture.

FRANCIS WALTER GUIBERT.